(12) United States Patent
Bruno et al.

(10) Patent No.: US 11,811,596 B1
(45) Date of Patent: Nov. 7, 2023

(54) SYSTEM AND METHOD FOR AUTOMATING THE REMOTE PROVISIONING OF DATA PROCESSING SYSTEMS

(71) Applicant: Dell Products L.P., Round Rock, TX (US)

(72) Inventors: Eric Joseph Bruno, Shirley, NY (US); Bradley K. Goodman, Nashua, NH (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/302,286

(22) Filed: Apr. 18, 2023

(51) Int. Cl.
*H04L 41/0806* (2022.01)
*H04L 41/0869* (2022.01)

(52) U.S. Cl.
CPC ...... *H04L 41/0806* (2013.01); *H04L 41/0869* (2013.01)

(58) Field of Classification Search
None
See application file for complete search history.

(56) References Cited

U.S. PATENT DOCUMENTS

| | | | |
|---|---|---|---|
| 2010/0107231 A1* | 4/2010 | Kavanagh | H04L 63/0892 714/48 |
| 2010/0202450 A1* | 8/2010 | Ansari | H04L 65/102 370/389 |
| 2016/0248703 A1* | 8/2016 | Gopalakrishnan | H04L 45/586 |
| 2020/0275273 A1* | 8/2020 | Smith | H04W 12/50 |
| 2021/0149766 A1* | 5/2021 | Arumugam | G06F 9/4881 |
| 2022/0394011 A1* | 12/2022 | Nakatsukasa | H04L 61/5014 |

\* cited by examiner

*Primary Examiner* — Atta Khan
(74) *Attorney, Agent, or Firm* — Womble Bond Dickinson (US) LLP

(57) ABSTRACT

Methods and systems for managing network provisioning for far edge devices are disclosed. New devices may be onboarded to a network at the far edge to provide computer-implemented services. Upon delivery to the far edge, the new devices may lack IP network configuration, which may be required to obtain provisioning data used to complete the onboarding process. That is, the new devices may be unable to access provisioning data until IP-based communications are established with a provisioning server. However, IP network configuration of the new devices may fail (e.g., when local DHCP servers fail to provide network configuration information), preventing initiation of the onboarding process. Thus, a remote service console may be implemented to automate network provisioning (e.g., when DHCP methods fail). The service console may be hosted by a service device and may provide the IP configuration information to new devices automatically, without user input and/or intervention.

20 Claims, 5 Drawing Sheets

SYSTEM AND METHOD FOR AUTOMATING THE REMOTE PROVISIONING OF DATA PROCESSING SYSTEMS

FIELD

Embodiments disclosed herein relate generally to managing data processing systems. More particularly, embodiments disclosed herein relate to systems and methods to manage the operation of a data processing system during a network provisioning process.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
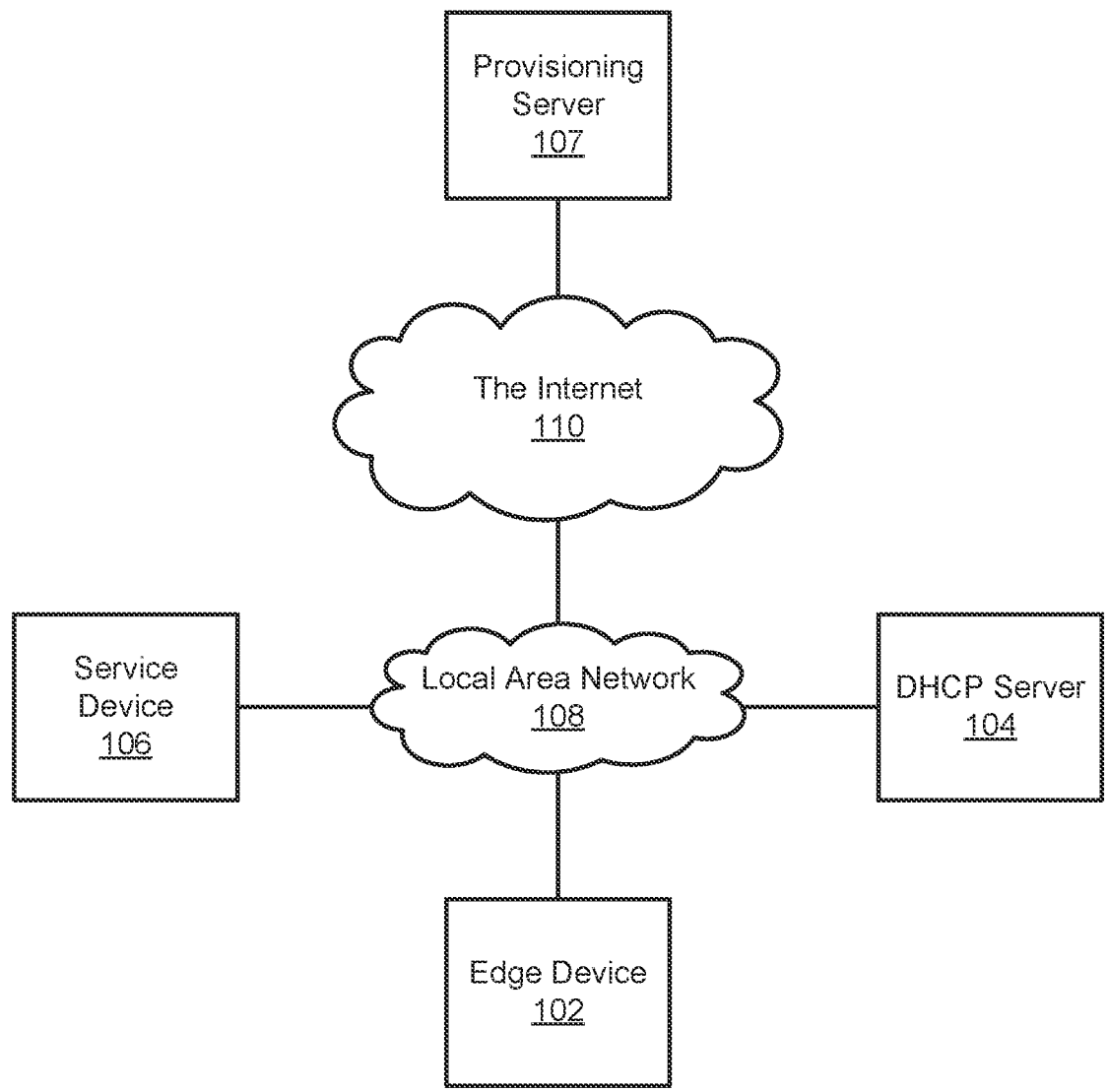
FIG. 1 shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing remote network provisioning of data processing systems (e.g., devices located at the far edge). In order to provide computer-implemented services, new devices may be added to current deployments, for example, as replacements for old devices and/or as additional devices in order to increase computing resources. New devices may be delivered to the far edge with a base level of configuration (e.g., the new devices may be assigned media access control (MAC) addresses). Upon arrival, the new devices may undergo a provisioning process (e.g., a network provisioning process) as part of the onboarding process.

To perform the network provisioning process, the new device may be connected to a local area network (e.g., of the current deployment) and may use dynamic host configuration protocol (DHCP) to obtain internet protocol (IP) networking capabilities. For example, the new device may establish a connection with a DHCP server in order to obtain configuration information (e.g., IP addresses) necessary to obtain IP-based communications and/or complete the network provisioning process. Then, using IP-based communications, the new device may obtain provisioning data (e.g., from a provisioning server accessible using IP-based communications) in order to complete the onboarding process.

However, the DHCP server may fail to assign an IP address to the new device for various reasons. In these cases, the new device may experience an IP network configuration failure, rendering the new device without IP-based communications, which may be necessary to complete the onboarding process. The new device may be unable to complete the onboarding process without manual intervention; however, manual intervention may be infeasible or inefficient due to a lack of expertise at the far edge and/or the physical inaccessibility of the installation of the new device. If new devices fail to complete onboarding, then the computer-implemented services provided by the deployment may be halted, reduced and/or otherwise negatively affected.

To prevent and/or reduce system downtime, a service console (e.g., a remote service console) may be implemented in order to manage and/or automate the network configuration of new devices at the far edge. The remote service console may be used to automate network provisioning in instances where the new device is unable to obtain configuration information using normal methods (e.g., via one or more DHCP servers). The remote service console may automatically supply configuration information to the new device using raw-socket MAC address-based networking, without requiring input from a user (e.g., an administrator). While the remote service console may perform its function autonomously (e.g., without user input), the service console may be accessed by a user and/or a data processing system in order to monitor the provisioning process (e.g., for large numbers of devices undergoing the process). The configuration information supplied by the service device may be usable to the new device to obtain the IP-based communications necessary to complete onboarding.

By doing so, an improved computing device and/or distributed system may be obtained. The improved device and/or system may provide an efficient and automated solution for remote network provisioning of new devices, including when primary methods (e.g., DHCP) fail. Implementation of the remote service console may also provide a solution to potential conflicts and/or incompatibilities arising from static IP addresses (e.g., IP addresses assigned to the new devices before delivery to the far edge).

In an embodiment, a computer implemented method for managing remote network provisioning of an edge device. The method may include, during an onboarding process, failing to obtain configuration information for internet protocol (IP)-based communications from a dynamic host configuration protocol (DHCP) server, the configuration information being attempted to be acquired to complete the onboarding process being performed by the edge device, and the edge device being connected to a local area network.

In response to the failing to obtain the configuration information, the method may include: broadcasting a communication on the local area network to reach a service device; and, establishing, based on the communication, a connection between the edge device and the service device, the connection being established via a layer of a communication protocol of the local area network using a media access control (MAC) address of the edge device while the IP-based communications are unavailable to the edge device.

The method may also include: obtaining the configuration information from the service device using the connection; configuring the IP-based communications for the edge device using the configuration information; communicating with a provisioning server using the IP-based communications to obtain provisioning data; and, completing the onboarding process using the provisioning data.

The configuration information may be pre-allocated to the service device and re-allocated by the service device to the edge device. The configuration information may include IP configuration information for the edge device. The configuration information may include information usable by the edge device to reach a second device using IP-based communications.

The communication may include a message indicating to the service device that the edge device is requesting the connection to the service device.

The service device may be independent from the DHCP server, and the service device may not implement the DHCP.

Performing the onboarding process may include providing information that allows the provisioning server to identify the edge device as a member of a deployment managed, at least in part, by the provisioning server.

In an embodiment, a non-transitory media is provided. The non-transitory media may include instructions that when executed by a processor cause the computer implemented method to be performed.

In an embodiment, a data processing system is provided. The data processing system may include the non-transitory media and a processor, and may perform the computer implemented method when the computer instructions are executed by the process.

Turning to FIG. 1, a block diagram illustrating a distributed system in accordance with an embodiment is shown. The system shown in FIG. 1 may provide computer-implemented services within local area network 108, and/or through a public network, such as the Internet 110. The system may include devices and/or data processing systems such as edge device 102, DHCP server 104, service device 106, and provisioning server 107. Any number of devices and/or data processing systems may provide the computer-implemented services independently and/or cooperatively.

For example, one or more data processing systems (e.g., edge device 102) of the system shown in FIG. 1 may provide computer-implemented services to users and/or other computing devices operably connected to the one or more data processing systems. The computer-implemented services may include any type and quantity of services including, for example, database services, instant messaging services, video conferencing services, etc. Different systems may provide similar and/or different computer-implemented services.

To provide the computer-implemented services, the data processing systems may host applications that provide these (and/or other) computer-implemented services. The applications may be hosted by one or more data processing systems (e.g., edge device 102). For example, in order to provide all or a portion of the computer-implemented services, one or more data processing systems (e.g., edge device 102) may obtain and/or provide data via operable connections to local area network 108 and/or the Internet 110.

Local area network 108 may be a local area network (LAN) and data processing systems and/or devices included in the local area network domain may be limited by ethernet and/or Wi-Fi connectivity. For example, local area network 108 may provide high-speed connectivity between connected devices using a layer 2 communications protocol. Local area network 108 may include a router and/or a network switch. The network switch may control data transfer between devices connected to local area network 108 using MAC address-based networking (e.g., the MAC addresses of connected devices being assigned to the ports of the network switch).

Local area network 108 may be connected to a wide area network (WAN) such as the Internet 110. The router may facilitate communications between networks by, for example, forwarding data between local area network 108 and the Internet 110. The Internet 110 may use a different layer of communication protocol than local area network 108, such as a layer 3 communication protocol (e.g., using IP-based networking). Therefore, if any device connected to local area network 108 is intended to communicate with another device via the Internet 110, the devices may need to be configured for IP-based communications (e.g., IP-based routing).

Over time, other data processing systems may need to be added to the system. For example, some existing data processing systems may fail and need to be replaced, the number of computer implemented services and/or capacity for the services may be expanded resulting in a need for additional data processing systems, and/or for other reasons.

To add a new data processing system (e.g., edge device 102) to the system, the new data processing system may undergo an onboarding process to a network domain (e.g., local area network 108). The onboarding process may include a network provisioning process. As part of the network provisioning process, the new data processing system may obtain provisioning data (e.g., from a provisioning server accessible by the Internet 110). The provisioning data may include network policies, ownership information, and/or other types of data. In order to obtain the provisioning data, the new data processing system may be configured for IP-based communications (e.g., in order to reach provisioning server 107 via the Internet 110).

For example, edge device 102 may be connected (e.g., via ethernet cable) to local area network 108 and may use MAC address-based raw-socket network communications to establish a connection with DHCP server 104 (e.g., using the MAC addresses of edge device 102 and DHCP server 104). Once the connection is established, DHCP server 104 may provide IP configuration information (e.g., an IP address) to edge device 102. Using the IP configuration information, edge device 102 may be configured for IP-based communications, allowing edge device 102 to establish a connection with provisioning server 107 (e.g., that stores and/or maintains provisioning data). Edge device 102 may then obtain the provisioning data from provisioning server 107 usable to perform the onboarding process (e.g., after which edge device 102 may be able to provide computer-implemented services).

However, if edge device 102 is unable to obtain IP configuration information from DHCP server 104, IP-based communications may not be established for edge device 102, inhibiting the performance and/or completion of the onboarding process. For example, DHCP server 104 may not be enabled, may not be functioning in the desired manner, or may experience some other type of failure that prevents DHCP server 104 from assigning an IP address to edge device 102. When IP configuration information is failed to be received by edge device 102, edge device 102 may enter a failure mode and may not be able to provide the desired computer-implemented services without manual intervention.

For example, manual network configuration may be performed (e.g., by an administrator) in order to establish IP-based communications for edge device 102. However, manual network configuration may not be feasible due to (i) time constraints (e.g., a large number of new data processing systems requiring network configuration), (ii) physical access constraints (e.g., the data processing system being physically inaccessible), (iii) hardware constraints (e.g., the data processing system lacking human interface devices such as a keyboard, mouse, display device, etc., required for user input), (iv) resources limitations (e.g., a lack of administrators available to perform the task), (v) informational limitations (e.g., a static IP address assigned at the time of manufacturing may conflict with or be incompatible with the local area network), and/or (vi) other reasons.

In general, embodiments disclosed herein may provide systems, devices, and methods for managing remote network provisioning of an edge device by providing automated methods for obtaining IP configuration information when other methods fail. The automated methods may include implementing a MAC address-based service console that may, without user intervention, facilitate the provisioning of IP configuration information to new edge devices. The service console may be hosted by a locally connected service device (e.g., service device 106), and may provide (e.g., using a layer 2 communication protocol such as MAC address-based communications) IP configuration information to other locally connected devices when DHCP servers fail to do so.

To provide its functionality, service device 106 may be connected (e.g., via ethernet cable) to local area network 108. Service device 106 may host software (e.g., a service console) that may facilitate service device 106 (i) automatically obtaining MAC address information of edge devices connected to local area network 108 (e.g., via a raw-socket listener), (ii) establishing connections with the edge devices (e.g., based on their MAC addresses)), (iii) obtaining data (e.g., failure notifications from the service console agent hosted by the edge devices and/or requests for IP configuration information from the edge devices), and/or (v) provide data (e.g., IP configuration information) to the edge devices.

Figure 2A:
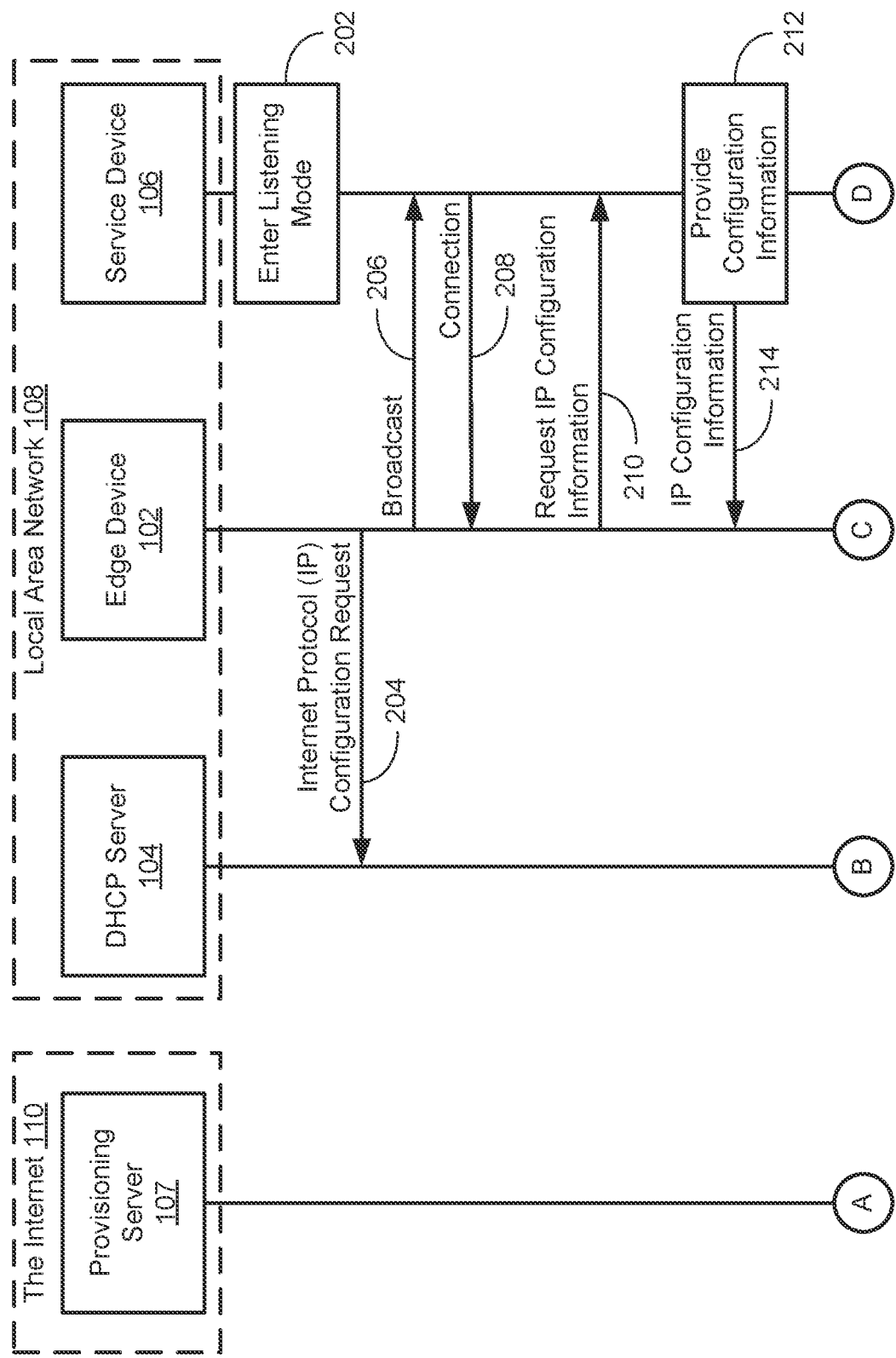
FIGS. 2A-2B show data flow diagrams illustrating an automated network provisioning process for a data processing system in accordance with an embodiment.
Figure 2B:
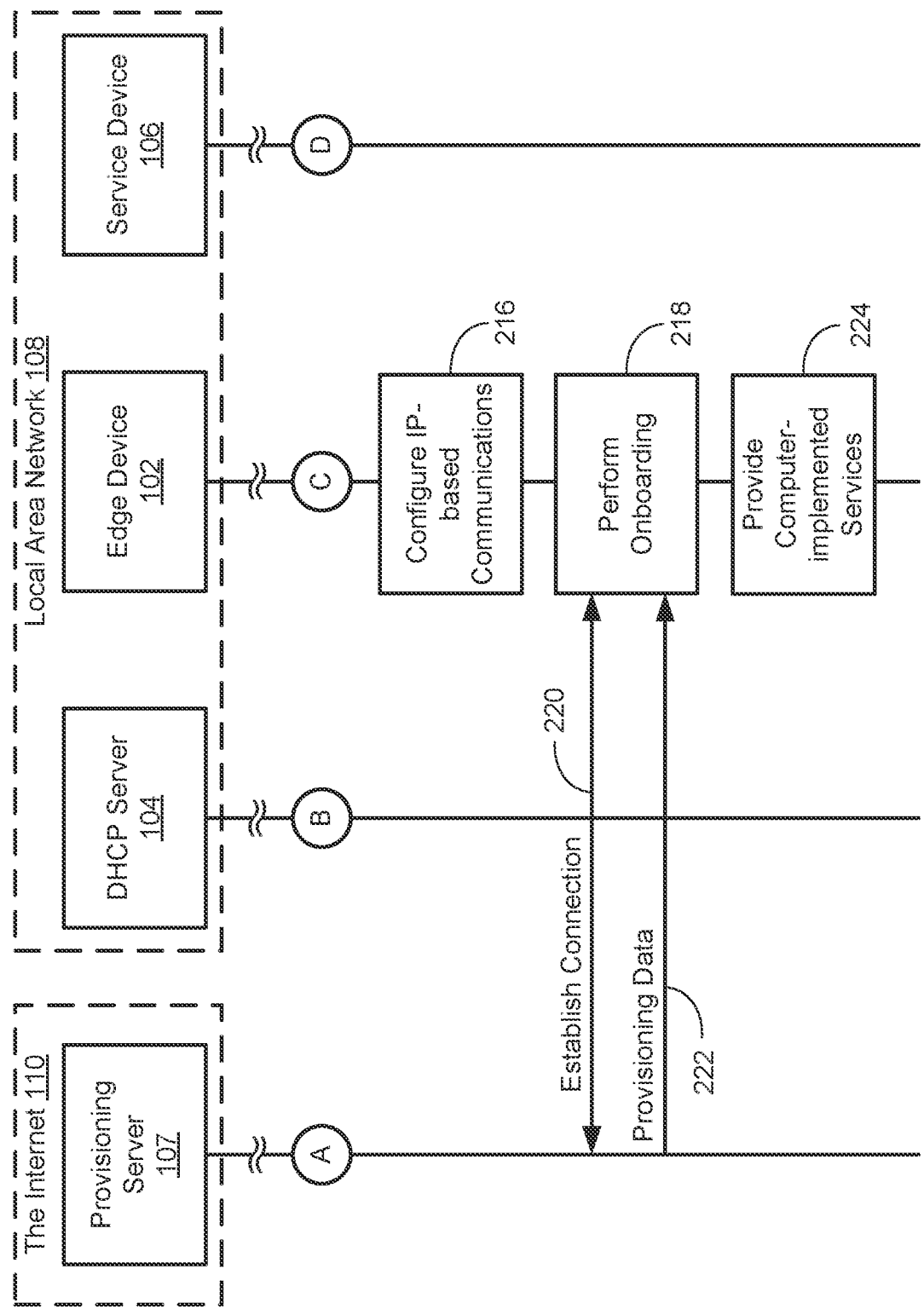

Edge device 102 may host software (e.g., a service console agent) in order to facilitate the provisioning process. For example, when edge device 102 is unable to obtain IP configuration information from DHCP server 104, the service console agent may facilitate (i) generation of a failure notification (e.g., indicating that IP configuration information may not be obtained from DHCP server 104), (ii) entering a broadcast mode (e.g., to broadcast messages from edge device 102 to other devices connected to local area network 108 in order to initiate a connection), (iii) establishing connections with devices connected to local area network 108 (e.g., using MAC address-based communications) and/or devices connected to the Internet 110 (e.g., using IP-based communications), (iv) obtaining data (e.g., IP configuration data from service device 106 and/or provisioning data from provisioning server 107), and/or (v) performing operations (e.g., IP network configuration processes and/or onboarding processes) in order to be able to provide computer-implemented services. Refer to FIGS. 2A-2B for more details regarding automated network provisioning processes.

Provisioning server 107 may participate in onboarding processes by (i) storing and/or managing data (e.g., provisioning data) usable to perform onboarding processes, (ii) establishing connections with devices via a wide area network (e.g., the Internet 110), (iii) provide data (e.g., provisioning data) to requesting devices (e.g., edge device 102) using IP-based communications, and/or (iv) providing other types of functionality relating to provisioning and/or onboarding processes.

By doing so, a system in accordance with embodiments disclosed herein may provide a method for managing and automating remote network provisioning for devices as part of the onboarding process. The automated network provisioning process may proceed without intervention and/or input from a user, improving the efficiency of acquiring IP-based communications for edge devices undergoing onboarding operations. In general, the onboarding processes for new edge devices may be improved by reducing data processing system downtime caused by a lack of network configuration, especially when manual network configuration is not feasible. By improving the onboarding processes for devices to new or existing deployments, service interruptions (e.g., of the computer-implemented services provided by the deployment) may be reduced.

Figure 3:
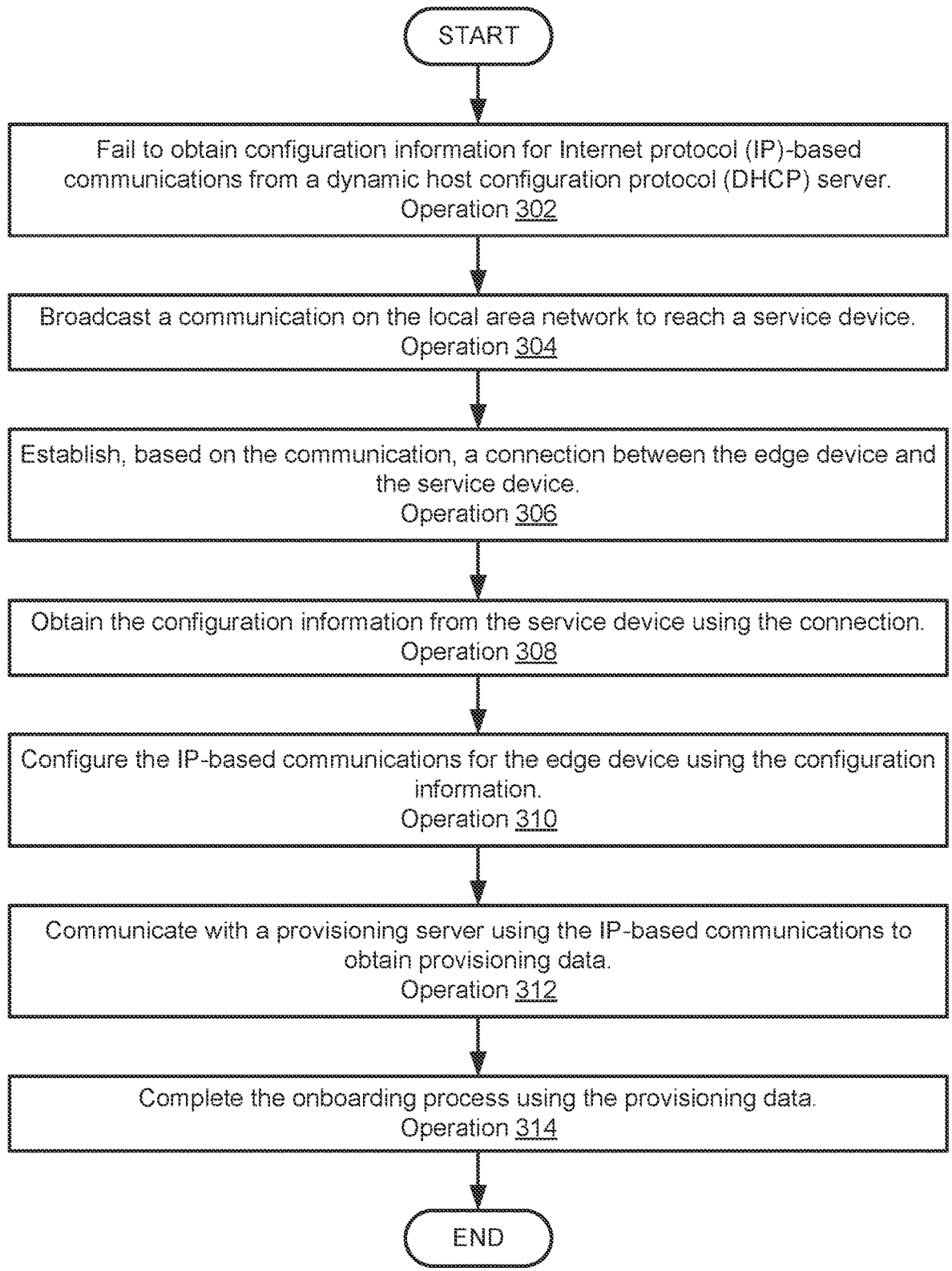
FIG. 3 shows a flow diagram illustrating a method of managing remote network provisioning of a data processing system in accordance with an embodiment.

When providing its functionality, edge device 102 may perform all, or a portion, of the method and/or actions shown in FIG. 3.

Edge device 102, DHCP server 104, service device 106, and/or provisioning server 107 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

Any of the components illustrated in FIG. 1 may be operably connected to each other (and/or components not illustrated) with a communication system. The communication system may include one or more networks (e.g., local area network 108 and/or the Internet 110) that facilitate communication between any number of components. The networks may include wired networks and/or wireless networks. The networks may operate in accordance with any number and types of communication protocols (e.g., such as IP-based communications).

While illustrated in FIG. 1 as included a limited number of specific components, a system in accordance with an embodiment may include fewer, additional, and/or different components than those illustrated therein.

Turning to FIGS. 2A-2B, a data flow diagram in accordance with an embodiment is shown. The data flow diagram may illustrate an automated network provisioning process for a data processing system, performed by a system similar to that of FIG. 1. As discussed in FIG. 1, edge device 102, DHCP server 104, and service device 106 may be connected to one another via a local area network (e.g., local area network 108), allowing the devices to communicate with one another via MAC address-based raw-socket network communications. Provisioning server 107 may be connected to a WAN (e.g., the Internet 110), and the WAN may facilitate connections between devices (e.g., via local area network 108) using IP-based communications. To automate and/or manage the remote provisioning process, a remote service console may run (e.g., automatically and/or in the background) on service device 106.

At operation 202, the remote service console may prompt service device 106 to enter a listening mode. For example, the remote service console may initiate creation of a raw-socket listener. While in the listening mode, the remote service console may enter a loop to wait for specific ethernet (e.g., layer 2 communications protocol) messages from other devices connected to local area network 108 (e.g., edge devices undergoing the network provisioning process). For example, the messages (e.g., packets) may include a specific payload expected by the remote service console, such as a request to connect with a specific MAC address.

As part of the network provisioning process, edge device 102 may attempt to obtain IP configuration information in order to be able to communicate over a wider network (e.g., IP-based networks such as the Internet 110).

At operation 204, in order to obtain the IP configuration information, edge device 102 may send an IP configuration request to DHCP server 104. However, DHCP server 104 may not obtain and/or fulfill the request (e.g., DHCP server 104 may not function as intended). Consequently, edge device 102 may fail to obtain IP configuration information from DHCP server 104, and edge device 102 may generate a failure message (e.g., a DHCP network configuration error) indicating so. In response to the failure, the service console agent (e.g., running on edge device 102 as part of the provisioning and/or onboarding process) may prompt edge device 102 to enter a broadcast mode.

At operation 206, while in the broadcast mode, a communication (e.g., a message) may be broadcasted on local area network 108. For example, the message may include a specific payload intended for and/or expected by the service console hosted by service device 106.

At operation 208, based on the message (e.g., a request to connect to a specific MAC address), a connection may automatically (e.g., without user intervention) be established between service device 106 and edge device 102.

At operation 210, once the connection is established, edge device 102 may automatically request IP configuration information from service device 106.

At operation 212, service device 106 may provide the requested configuration information 214 to edge device 102. Configuration information (e.g., IP addresses) may be pre-allocated to and/or stored on service device 106 in order to be provided (e.g., re-allocated) to edge devices requesting the IP information from service device 106 (e.g., when DHCP and/or other methods of obtaining IP configuration information fail).

At operation 216, edge device 102, having received IP configuration information, may configure IP-based communications. The configuration process may be initiated automatically by the service console agent. Once IP-based communications are configured and/or network connectivity is confirmed (e.g., tested), edge device 102 may be able to communicate across networks using a higher layer of communication protocol (e.g., the Internet 110).

At operation 218, edge device 102 may performing onboarding. Onboarding may include downloading and/or installing software modifying configuration settings, setting up user accounts, modifying security settings to meet security policies, etc. Thus, to do so, onboarding may include obtaining data (e.g., provisioning data).

At operation 220, a connection is established between edge device 102 and provisioning server 107 in order to obtain provisioning data. The connection may be established using IP-based communications via the Internet 110 (e.g., through local area network 108). For example, edge device 102 may perform network ping operations to confirm connectivity with provisioning server 107.

Provisioning data 222 may be provided to edge device 102 by provisioning server 107 (e.g., the content of the provisioning data being based on identification information of edge device 102). Onboarding may be completed by edge device 102 using the obtained provisioning data.

At operation 224, upon completing onboarding, edge device 102 may provide computer-implemented services. The computer-implemented services may be provided using software installed on the edge device (e.g., installed during onboarding) and/or via established network connectivity (e.g., including IP-based communications across wider networks).

Any number of edge devices requiring network provisioning and/or onboarding may be configured using the described network provisioning process.

Thus, as illustrated in FIGS. 2A-2B, the system of FIG. 1 may provide an improved and efficient method for automated remote network provisioning of edge devices (e.g., when IP configuration information is inaccessible from the DHCP server). In response to DHCP failures, the edge devices may proactively (e.g., automatically) request IP configuration information another local device (e.g., service device 106) using MAC address-based raw-socket network communication. Using local area network communications to establish IP network connectivity, the edge devices may proceed to subsequent processes, such as onboarding processes (e.g., only reachable via IP-based communications).

By doing so, when network provisioning may not proceed with conventional methods (e.g., via one or more DHCP servers), in environments where (i) a large number of edge devices may require onboarding, (ii) the edge devices may be physically inaccessible (e.g., for manual network configuration), and/or (iii) resources are limited (e.g., lacking qualified users to troubleshoot configuration errors), the described automated remote network provisioning process may improve onboarding efficiency and reduce system downtime.

As discussed above, the components of FIG. 1 may perform methods to manage and/or automate remote network provisioning of data processing systems that provide computer-implemented services.

Turning to FIG. 3, a flow diagram illustrating a method of managing remote network provisioning of a data processing system in accordance with an embodiment are shown. The methods may be performed by any of edge device 102, DHCP server 104, service device 106, provisioning server 107, and/or any other components of the system shown in FIG. 1. Any of the operations described with respect to FIG. 3 may be performed in different orders, skipped, repeated, and/or be performed in a parallel or partially overlapping in time manner.

Turning to FIG. 3, at operation 302, during an onboarding process, configuration information for IP-based communications from a DHCP server may be failed to be obtained.

The configuration information may be failed to be obtained by (i) the edge device failing to establish a connection with the DHCP server, and/or (ii) the edge device receiving a failure message from the DHCP server indicating that the DHCP server is unable to assign the edge device an IP address (e.g., a DHCP server error). The functionality of the DHCP server may not be redundantly provided to the edge device. For example, any or all of one or more DHCP servers may be disabled and/or may return the failure message to the edge device.

The edge device may be limited to (e.g., connected to) a local area network, and may attempt to acquire the configuration information (e.g., IP configuration information) in order to complete a network configuration process. The edge device may be physically inaccessible without substantial effort, making manual network configuration infeasible. For example, the edge device may be physically inaccessible without substantial effort when the edge device (i) is not positioned in a computing environment designed to facilitate access to computing devices (e.g., edge devices), and/or (ii) is not directly operable using any human interface devices (e.g., keyboard, mouse, display device, etc.).

At operation 304, in response to the failing to obtain the configuration information, a communication may be broadcasted on the local area network to reach a service device. The communication may be broadcasted by transferring the communication (e.g., a message) from the edge device to one or more devices (e.g., sockets) connected to the local area network. For example, a service console agent running on the edge device (e.g., the agent used to manage and/or monitor the remote network provisioning process) may respond to a network configuration error by initiating broadcast mode.

The communication may be directed to a second device (e.g., the service device) connected to the local area network. The communication may include a message indicating to the service device that the edge device is requesting a connection and/or other specific information from the edge device. For example, the edge device may broadcast a message with a source MAC address of the edge device and a destination MAC address of the service device, the payload of which indicating that the edge device is requesting IP configuration information from the service device. The service console may receive the message and prompt the service device to supply the edge device with the requested IP configuration information. The service device may store and/or have access to pre-allocated IP configuration information, and/or may not be a DHCP server (e.g., may not implement the same functionality of the DHCP server such as assignment of IP addresses).

The communication may be received by the service device through the local area network (e.g., MAC address-based raw-socket networking communications). The communication may be received while the edge device is unable to communicate via IP-based communications, and therefore may be received through lower layer (e.g., layer 2) network communication protocol. The communication from the edge device may be received automatically (e.g., by the raw-socket listener awaiting communication via the local area network). The received communication may be a request to connect and may be used to establish a connection between the two devices.

At operation 306, a connection between the edge device and the service device may be established based on the communication. The connection between the edge device and the service device may be established by the edge device accepting a connection (e.g., the communication) from the service device. As IP-based communications may be unavailable to the edge device (e.g., due to the lack of TCP/IP network configuration), the connection may be established via a layer of communication protocol (e.g., data link) of the local area network. Data (e.g., IP configuration information) may be sent and/or received between the edge device and the service device via the established connection.

At operation 308, the configuration information may be obtained from the service device using the connection. The configuration information may be obtained by receiving the configuration information (e.g., by the edge device) from one or more data processing systems (e.g., the service device) via the data link communication protocol. The configuration information may include IP configuration information for the edge device, usable to configure IP-based communications for the edge device. For example, a portion of pre-allocated configuration information (e.g., allocated to the service device) may be re-allocated to the edge device, the configuration information usable to enable the edge device to reach a second device using IP-communications.

At operation 310, the IP-based communications for the edge device may be configured using the configuration information. The IP-based communications may be configured by assigning network settings, policies, flows, and controls (e.g., based on the configuration information). For example, network configuration may include assigning an IP address to the edge device, setting passwords to control accessibility, selecting communication channels to improve network performance, and/or verifying network settings.

Once IP network settings are configured for the edge device, the edge device may be able to communicate with a second device using IP-based communications. For example, the edge device may be able to communicate with a provisioning server that is reachable via a wider network, such as the Internet, and is therefore not reachable via only the local area network.

At operation 312, a provisioning server may be communicated with using the IP-based communications to obtain provisioning data. The provisioning server my be communicated with by The provisioning data may be obtained by sending a request to the provisioning server. The request for provisioning data may include information regarding the edge device (e.g., identifying information for the device, the deployment, etc.) that may influence the type of provisioning data provided by the provisioning server. For example, the edge device may provide information that allows the provisioning server to identify the edge device as a member of a deployment. The deployment may receive a specific portion of provisioning data available to the provisioning server and may be managed, in part, by the provisioning server.

At operation 314, the onboarding process may be completed using the provisioning data. The onboarding process may be completed by configuring the edge device to (e.g., for network connectivity, to meet security policies, etc.) and/or integrating the edge device with other data processing systems in the deployment. For example, the onboarding process may include onboarding the edge device to a network domain and/or placing the edge device in a pre-determined mode of operation that meets standards of a domain. Once onboarded, the edge device may be able to provide computer-implemented services (e.g., independently of and/or cooperatively with other members (e.g., devices) of the deployment.

The method may end following operation 314.

Thus, as illustrated above, embodiments disclosed herein may provide systems and methods usable to manage and/or automate the provisioning process of edge devices and/or other data processing systems. A secondary source for configuration information (e.g., when a DHCP server connection fails) may be provided, using a layer of communication protocol available to the edge devices before IP network configuration. The edge devices may automatically connect with and/or request configuration information from the secondary source. The secondary source may automatically provide the request information without the need for user input and/or intervention. By doing so, the onboarding process for edge devices may be automated and/or monitored using a remote service console hosted by the edge devices. By implementing a seamless solution for automated network provisioning, disruptions to the onboarding process may be reduced, which may also reduce disruptions to the provided computer-implemented services.

Thus, embodiments disclosed herein may provide an improved computing device that is able to increase the efficiency of the device onboarding process via an added layer of automation. Consequently, system downtime that may occur due to network configuration errors may be reduced. Accordingly, the disclosed process provides for both an embodiment in computing technology and an improved method for managing secure data access.

Figure 4:
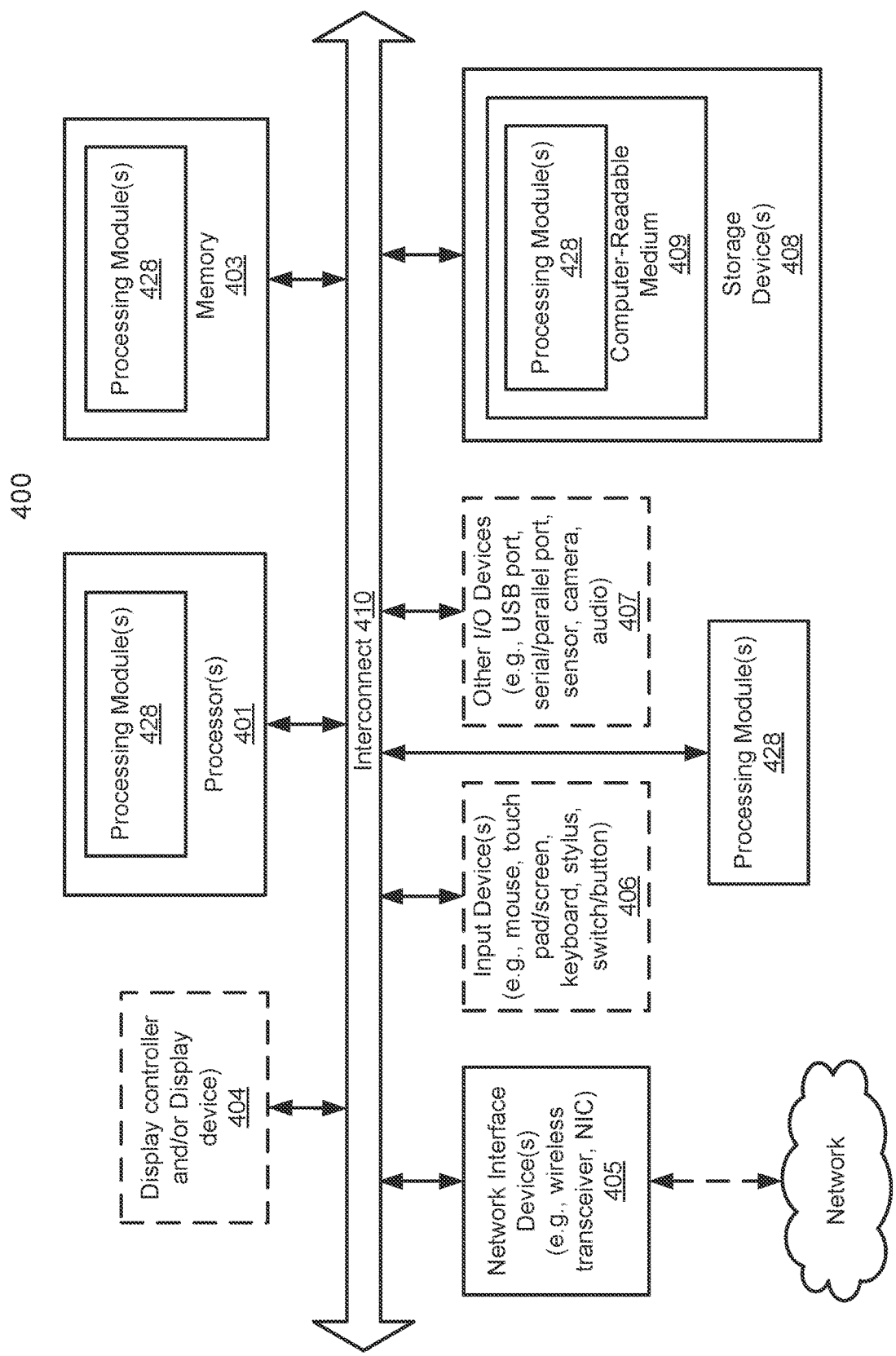
FIG. 4 shows a block diagram illustrating a data processing system in accordance with an embodiment.

Any of the components illustrated in FIGS. 1-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing remote network provisioning of an edge device, the method comprising:
    during an onboarding process:
        failing to obtain configuration information for internet protocol (IP)-based communications from a dynamic host configuration protocol (DHCP) server, the configuration information being attempted to be acquired to complete the onboarding process being performed by the edge device, and the edge device being connected to a local area network, and
        in response to the failing to obtain the configuration information:
            broadcasting a communication on the local area network to reach a service device;
            establishing, based on the communication, a connection between the edge device and the service device, the connection being established via a layer of a communication protocol of the local area network using a media access control (MAC) address of the edge device while the IP-based communications are unavailable to the edge device;
            obtaining the configuration information from the service device using the connection;
            configuring the IP-based communications for the edge device using the configuration information;
            communicating with a provisioning server using the IP-based communications to obtain provisioning data; and
            completing the onboarding process using the provisioning data,
        wherein performing the onboarding process comprises: providing information that allows the provisioning server to identify the edge device as a member of a deployment managed, at least in part, by the provisioning server.

2. The method of claim 1, wherein the configuration information is pre-allocated to the service device and re-allocated by the service device to the edge device.

3. The method of claim 2, wherein the configuration information comprises IP configuration information for the edge device.

4. The method of claim 3, wherein the configuration information comprises information usable by the edge device to reach a second device using IP-based communications.

5. The method of claim 1, wherein the communication comprises a message indicating to the service device that the edge device is requesting the connection to the service device.

6. The method of claim 1, wherein the service device is independent from the DHCP server, and the service device does not implement the DHCP.

7. The method of claim 1, wherein the onboarding process comprises placing the edge device in a pre-determined mode of operation that meets standards of a domain.

8. A non-transitory machine-readable medium having instructions stored therein, which when executed by a processor, cause the processor to perform operations for managing remote network provisioning of an edge device, the operations comprising:
    during an onboarding process:
        failing to obtain configuration information for internet protocol (IP)-based communications from a dynamic host configuration protocol (DHCP) server, the configuration information being attempted to be acquired to complete the onboarding process being performed by the edge device, and the edge device being connected to a local area network, and
        in response to the failing to obtain the configuration information:
            broadcasting a communication on the local area network to reach a service device;
            establishing, based on the communication, a connection between the edge device and the service device, the connection being established via a layer of a communication protocol of the local area network using a media access control (MAC) address of the edge device while the IP-based communications are unavailable to the edge device;
            obtaining the configuration information from the service device using the connection;
            configuring the IP-based communications for the edge device using the configuration information;
            communicating with a provisioning server using the IP-based communications to obtain provisioning data; and
            completing the onboarding process using the provisioning data,
            wherein performing the onboarding process comprises: providing information that allows the provisioning server to identify the edge device as a member of a deployment managed, at least in part, by the provisioning server.

9. The non-transitory machine-readable medium of claim 8, wherein the configuration information is pre-allocated to the service device and re-allocated by the service device to the edge device.

10. The non-transitory machine-readable medium of claim 9, wherein the configuration information comprises IP configuration information for the edge device.

11. The non-transitory machine-readable medium of claim 10, wherein the configuration information comprises information usable by the edge device to reach a second device using IP-based communications.

12. The non-transitory machine-readable medium of claim 8, wherein the communication comprises a message indicating to the service device that the edge device is requesting the connection to the service device.

13. The non-transitory machine-readable medium of claim 8, wherein the service device is independent from the DHCP server, and the service device does not implement the DHCP.

14. A data processing system, comprising:
    a processor; and
    a memory coupled to the processor to store instructions, which when executed by the processor, cause the processor to perform operations for managing remote network provisioning of an edge device, the operations comprising:

during an onboarding process:
  failing to obtain configuration information for internet protocol (IP)-based communications from a dynamic host configuration protocol (DHCP) server, the configuration information being attempted to be acquired to complete the onboarding process being performed by the edge device, and the edge device being connected to a local area network; and
  in response to the failing to obtain the configuration information:
    broadcasting a communication on the local area network to reach a service device,
    establishing, based on the communication, a connection between the edge device and the service device, the connection being established via a layer of a communication protocol of the local area network using a media access control (MAC) address of the edge device while the IP-based communications are unavailable to the edge device,
    obtaining the configuration information from the service device using the connection,
    configuring the IP-based communications for the edge device using the configuration information,
    communicating with a provisioning server using the IP-based communications to obtain provisioning data, and
    completing the onboarding process using the provisioning data,
    wherein performing the onboarding process comprises: providing information that allows the provisioning server to identify the edge device as a member of a deployment managed, at least in part, by the provisioning server.

15. The data processing system of claim 14, wherein the configuration information is pre-allocated to the service device and re-allocated by the service device to the edge device.

16. The data processing system of claim 15, wherein the configuration information comprises IP configuration information for the edge device.

17. The data processing system of claim 16, wherein the configuration information comprises information usable by the edge device to reach a second device using IP-based communications.

18. The data processing system of claim 14, wherein the communication comprises a message indicating to the service device that the edge device is requesting the connection to the service device.

19. The data processing system of claim 14, wherein the service device is independent from the DHCP server, and the service device does not implement the DHCP.

20. The non-transitory machine-readable medium of claim 8, wherein the onboarding process comprises placing the edge device in a pre-determined mode of operation that meets standards of a domain.

* * * * *